No. 719,928. PATENTED FEB. 3, 1903.
E. V. WILLIAMS.
MANUFACTURE OF DENTAL CROWNS.
APPLICATION FILED APR. 29, 1902.
NO MODEL.
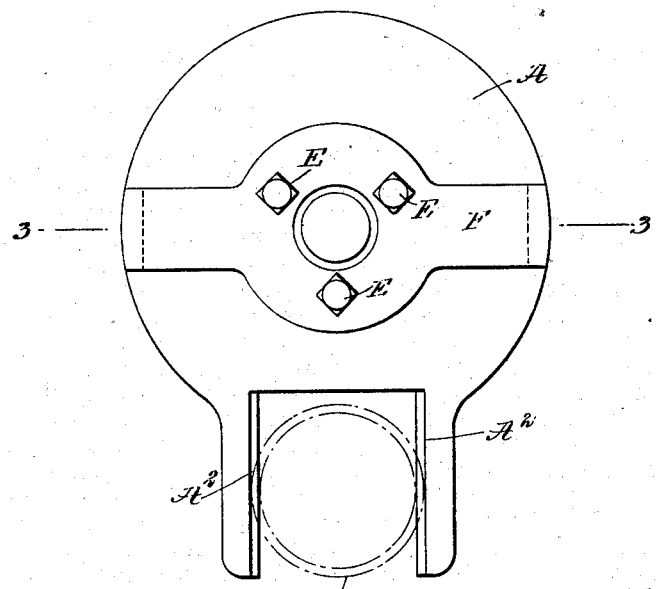
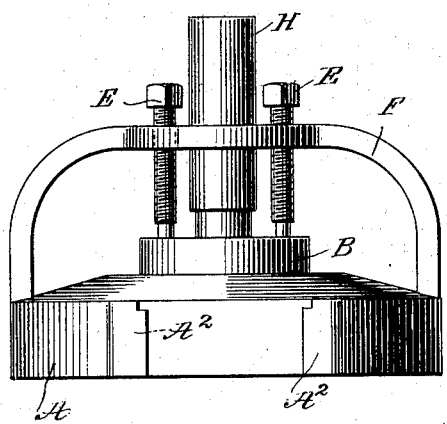
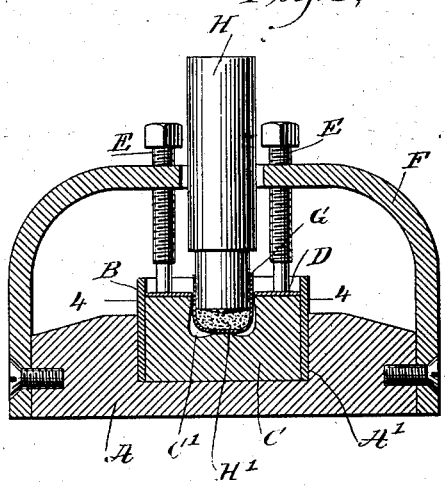
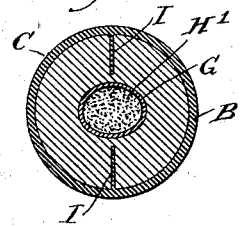
WITNESSES:
Edward Thorpe
Theo. G. Hoskr
INVENTOR
Evart Velie Williams
BY
ATTORNEYS

UNITED STATES PATENT OFFICE.

EVART VELIE WILLIAMS, OF ARGYLE, WISCONSIN.

MANUFACTURE OF DENTAL CROWNS.

SPECIFICATION forming part of Letters Patent No. 719,928, dated February 3, 1903.

Application filed April 29, 1902. Serial No. 105,180. (No model.)

*To all whom it may concern:*

Be it known that I, EVART VELIE WILLIAMS, a citizen of the United States, and a resident of Argyle, in the county of Lafayette and State of Wisconsin, have invented new and useful Improvements in the Manufacture of Dental Crowns, of which the following is a full, clear, and exact description.

The invention relates to dentistry; and its object is to provide certain new and useful improvements in the manufacture of dental crowns whereby a seamless crown is produced conforming in every detail as nearly as possible to the original tooth.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the apparatus for manufacturing seamless dental crowns. Fig. 2 is a side elevation of the same. Fig. 3 is a sectional side elevation of the same on the line 3 3 of Fig. 1. Fig. 4 is a sectional plan view of the mold on the line 4 4 of Fig. 3, and Fig. 5 is a sectional side elevation of the finished crown.

The improved apparatus for the manufacture of seamless dental crowns is provided with a base A, formed in its top with a recess A', into which fits a band B, inclosing the mold C, having a recess C' in its top portion, the wall of the recess conforming to the shape of the crown to be made. The bottom of the mold C rests on the bottom of the recess A', and the top of the mold C is engaged by a retaining-plate D, preferably in the shape of a ring and engaged by screws E, screwing in a yoke F, attached to the sides of the base A, the said screws and retaining-plate D serving to hold the mold C firmly in position in the recess A' of the base A and the retaining-plate D by reason of possessing an opening corresponding in shape to the plunger H and of such size that the insertion of the cup G and plunger H will close said opening, serving also to prevent any escape of the swaging material H' no matter what the shape of the opening to the mold may be.

A cup G of sheet metal, intended to form the crown, is inserted in the recess C' of the mold C, as plainly shown in Fig. 3, and in order to press the walls of the cup G in contact with the walls of the recess C' in the mold to form the crown I employ a male die consisting of two parts—namely, a plunger H and a yielding material H', such as sand, loose fiber, or the like—placed in the bottom of the cup G to be pressed by the lower end of the plunger H to cause the yielding material to exert a pressure against the walls of the cup to press the walls of the cup outward in firm contact with the walls of the recess C', so that the cup completely assumes an external shape conforming in every detail to the wall of the recess C'—that is, to the shape of a model which represents the tooth it is desired to reproduce.

The plunger H is forced downward by suitable means. When the cup has been formed into the seamless crown, as described, then the male die is removed from the cup, and the screws E are unscrewed to allow removal of the mold C and its band B, which are now removed from the recess A' and transferred onto shoulders A², formed on fork members projecting from the base A, as plainly shown in Fig. 1, to allow of driving the mold C out of the band B.

Now in order to remove the crown from its containing-mold C it is necessary to open the mold, and for this purpose I prefer to make the mold dividable by the insertion of metallic plates or strips I, preferably disposed radially and inserted into the fusible metal of which the mold is made. (See Fig. 4.) By this arrangement the mold C may be easily broken or opened up into three, four, or more parts, so that the seamless crown can be removed from the mold. The produced seamless crown is preferably reinforced at its top by solder G' flowed into the crown.

The mold C is made in any approved manner to produce a recess conforming in every detail produced by the crown as represented by the model.

Having thus described my invention, I claim as new and desire to secure by Letters Patent—

1. An apparatus for making dental crowns, comprising a mold having a cavity conforming to the shape of the crown to be made and into which the blank in the form of a cup is inserted with a portion projecting above the top of the mold, an apertured plate resting on the mold and through the aperture of which the projecting portion of the cup extends, and a male die for engaging the cup and pressing the same into contact with the wall of the cavity of the mold, as set forth.

2. An apparatus for making dental crowns, comprising a mold having a cavity conforming to the shape of the crown to be made and into which the metal blank in the form of a cup is inserted with a portion projecting above the top of the mold, a male die for engaging the cup and pressing the same in contact with the wall of the mold, the male die consisting of a yielding material placed in the cup, and a plunger inserted into the cup and forced into engagement with the yielding material, and a retaining-plate over the die, having an aperture for the passage of the projecting portion of the cup, as set forth.

3. An apparatus for making dental crowns, comprising a dividable mold, a rigid retaining-plate at the top of the mold, having an aperture registering with the opening in the mold and through which the cup-shaped blank is adapted to project, and a band inclosing the said mold and the said retaining-plate, as set forth.

4. An apparatus for making dental crowns, comprising a dividable mold, a rigid retaining-plate in the top of the mold, having an aperture registering with the opening in the mold and through which the cup-shaped blank is adapted to project, a band inclosing the said mold and the said retaining-plate, a support for the mold and band, and means for holding the retaining-plate in position, as set forth.

5. An apparatus for making dental crowns, consisting of a recessed base provided with a yoke, having a central aperture, a dividable mold in the recess of the base, a band fitting in the said recess around the mold and projecting above the top of the said mold, an apertured retaining-plate fitting into the band and resting upon the top of the mold, screws screwing in the yoke of the base and engaging the said retaining-plate, and a male die consisting of a yielding material and a plunger, as set forth.

6. An apparatus for making dental crowns, comprising a recessed base provided with a yoke having a central aperture, a mold in the recess of the base, a band fitting in the said recess around the mold and projecting above the top of the mold, a retaining-plate fitting into the band upon the top of the mold, screws screwing into the yoke and engaging the retaining-plate, and a male die, as set forth.

7. An apparatus for making dental crowns, comprising a base having a central recess, and provided with laterally-projecting forked members having shoulders, a mold in the recess of the base, a band in the said recess around the mold, and a male die, as set forth.

In testimony whereof I have signed my name to this specification in the presence of two subscribing witnesses.

EVART VELIE WILLIAMS.

Witnesses:
F. A. WADDINGTON,
OSCAR J. OLSON.